United States Patent
Fu et al.

(10) Patent No.: US 9,122,280 B2
(45) Date of Patent: Sep. 1, 2015

(54) CONTROL SYSTEMS AND METHODS FOR CONTROLLING A DRY FEED SYSTEM TO CONVEY A SOLID FUEL

(75) Inventors: Xu Fu, Shanghai (CN); Zhongzhi Hu, Shanghai (CN); Tong Zhao, Shanghai (CN); Zili Cai, Shanghai (CN); Yao Chen, Shanghai (CN); Baoming Huang, Shanghai (CN); Wei Chen, Shanghai (CN); Ke Liu, Irvine, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 146 days.

(21) Appl. No.: 13/112,386

(22) Filed: May 20, 2011

(65) Prior Publication Data

US 2011/0301761 A1    Dec. 8, 2011

(30) Foreign Application Priority Data

Jun. 3, 2010 (CN) .......................... 2010 1 0193544

(51) Int. Cl.
*G05B 11/01* (2006.01)
*G05B 13/02* (2006.01)
(Continued)

(52) U.S. Cl.
CPC ............... *G05D 7/0605* (2013.01); *F23K 3/02* (2013.01); *F23G 2205/20* (2013.01)

(58) Field of Classification Search
CPC ............ F01N 2240/30; F01N 2250/12; F01N 2260/04; F01N 2410/00; F01N 2430/08; F01N 2550/03; F01N 2590/08; F01N 2610/04; F01N 3/2066; F02C 9/26; F23K 3/02; G01F 1/86; G05D 7/0605

USPC ............ 700/19, 20, 40, 67, 242, 266; 702/22, 702/24, 31, 57; 198/464.1
See application file for complete search history.

(56) References Cited

U.S. PATENT DOCUMENTS

| | | | |
|---|---|---|---|
| 4,489,562 A | 12/1984 | Snyder et al. | |
| 4,863,316 A | 9/1989 | Gianella et al. | |

(Continued)

FOREIGN PATENT DOCUMENTS

| | | |
|---|---|---|
| CN | 87103098 A | 11/1987 |
| CN | 1031208 A | 2/1989 |

(Continued)

OTHER PUBLICATIONS

Polish Search Report issued in connection with corresponding PL Patent Application No. P-395110 filed on Jun. 3, 2011.

(Continued)

*Primary Examiner* — Dean Kwak
(74) *Attorney, Agent, or Firm* — GE Global Patent Operation; Peter T. DiMauro

(57) ABSTRACT

A control system for controlling a dry feed system to convey a solid fuel includes multiple sensors, a pressurizing gas controller, at least one assistant gas controller and multiple gas valves. The sensors generate multiple measurement signals signifying characteristics of the dry feed system. The pressuring gas controller calculates a feed tank pressure bias or/and a pressuring gas flow bias based on a solid flow rate and generates a first control signal based on the pressure bias or/and the pressurizing gas flow bias. The assistant gas controller calculates an assistant gas bias based on a solid loading ratio and generates a second control signal based on the assistant gas bias. The gas valves are driven by the first or/and second control signals to regulate the solid fuel. A control method is also described.

11 Claims, 6 Drawing Sheets

(51) Int. Cl.
*G05B 11/32* (2006.01)
*G01N 31/00* (2006.01)
*G01R 15/00* (2006.01)
*G05D 7/06* (2006.01)
*F23K 3/02* (2006.01)

(56) References Cited

U.S. PATENT DOCUMENTS

| | | | |
|---|---|---|---|
| 7,024,251 | B2 | 4/2006 | Martens |
| 8,858,123 | B2 | 10/2014 | Schmit et al. |
| 2008/0147241 | A1* | 6/2008 | Tsangaris et al. ............. 700/273 |
| 2009/0013601 | A1 | 1/2009 | Mandich et al. |
| 2011/0061298 | A1* | 3/2011 | Frey et al. ...................... 48/78 |

FOREIGN PATENT DOCUMENTS

| | | |
|---|---|---|
| CN | 101323398 A | 12/2008 |
| CN | 201265871 Y | 7/2009 |
| EP | 0243269 A2 | 10/1987 |
| JP | 2000328073 A | 11/2000 |
| WO | 2009063037 A1 | 5/2009 |
| WO | 2011041032 A | 4/2011 |
| WO | 2011068641 A | 6/2011 |

OTHER PUBLICATIONS

Chinese office action issued in connection with CN Patent Application No. 201010193544.6 dated Aug. 5, 2014.
Saether, "Control system for mass flow rate of solids in pneumatic conveying", Master Thesis 2008, Jun. 6, 2008.
Unofficial English translation of Office Action issued in connection with corresponding CN Application No. 201010193544.6 on Apr. 3, 2013.
Office Action issued in connection with corresponding PL Application No. P-395110 on Nov. 6, 2014.
Cai et al., "Investigation of Dense-Phase Pneumatic Conveying Characteristic of Pulverized Coal Under High Pressure", Proceedings of the CSEE, Chinese Society for Electrical Engineering, vol. No. 27, Issue No. 14, May 2007.
Peng et al., "Experimental Research on High-pressure Super Dense-Phase Pneumatic Conveying of Pulverized Coal", Journal of Power Engineering, vol. No. 27, Issue No. 5, Oct. 2007.

* cited by examiner

CONTROL SYSTEMS AND METHODS FOR CONTROLLING A DRY FEED SYSTEM TO CONVEY A SOLID FUEL

BACKGROUND

The invention generally relates to control systems and methods for a dry feed system to pneumatically convey a solid fuel to a container such as a gasifier.

The dry feed system generally has a feed tank and a plurality of pipelines. The feed tank receives the solid fuel and a carrier gas through the pipelines and outputs a solid-gas mixture. The pipelines have a mixture pipeline connecting the feed tank and the gasifier for conveying the solid-gas mixture. The stable and controllable solid fuel flow has significant influence on the gasification performance of the gasifier. Therefore, control systems are used for controlling the solid, fuel conveyance. For the control systems, solid mass flow rate (referred to as "solid flow rate" hereinafter) in the solid-gas mixture is a significant parameter for monitoring and adjusting the solid fuel flow.

In a conventional control system, the pressure of the feed tank (referred to as "feed tank pressure") is adjusted to control the solid flow rate. In another conventional control system, solid control valves are distributed and installed on the mixture pipeline. The solid control valves adjust the solid flow rate by responding to the control signals based on the real time solid flow rate. Although the latter conventional control system can achieve a more stable solid fuel flow than the former one, the solid control valves are usually required to be made of a wear resistant material since the solid fuel may cause significant wear abrasion to the solid control valves. As a result, the production cost of the solid control valves is higher due to these material requirements.

Therefore, there is a need to provide improved and economical control systems and methods that can control the solid fuel stably conveyed.

BRIEF DESCRIPTION

In accordance with one embodiment, a control system for controlling a dry feed system to convey a solid fuel in a solid-gas mixture comprises a plurality of sensors, a pressuring gas controller, at least one assistant gas controller and a plurality of gas valves. The sensors generate a plurality of measurement signals signifying characteristics of the dry feed system. The pressuring gas controller calculates one or both of a feed tank pressure bias and a pressuring gas flow bias based on a solid flow rate (SR) in the solid-gas mixture that is determined by at least one of the measurement signals and generates at least one first control signal based on one or both of the pressure bias and the pressurizing gas flow bias. The at least one assistant gas controller calculates an assistant gas bias based on a solid loading ratio (SLR) in the solid-gas mixture that is determined by at least one of the measurement signals and generates at least one second control signal based on the assistant gas bias. The gas valves are driven by one or both of the first and second control signals to regulate the solid fuel in the solid-gas mixture by changing area/time pressurizing gas flow and a real time assistant gas flow In accordance with another embodiment, a pneumatically conveying system comprises a dry feed system and a control system for controlling the dry feed system to convey a solid fact in a solid-gas mixture. The dry feed system comprises a feed tank for receiving the solid fuel and a pressurizing gas to form the solid-gas mixture therein; at least one pressurizing gas pipeline for conveying the pressurizing gas into the feed tank; at least one mixture pipeline for conveying the solid-gas mixture out of the feed tank; and at least one supplemental gas pipeline for introducing a supplemental gas into the solid-gas mixture in the mixture pipeline. The control system comprises a plurality of sensors for generating a plurality of measurement signals signifying characteristics of the dry feed system; a pressurizing gas controller for calculating one or both of a feed tank pressure bias and a pressuring gas flow bias based on a solid flow rate (SR) in the solid-gas mixture that is determined by at least one of the measurement signals; and generating at least one first control signal based on one or both of the pressure bias and the pressurizing gas flow bias; a supplemental gas flow controller calculating a supplemental gas bias based on a solid loading ratio (SLR) in the solid-gas mixture that is determined by at least one of the measurement signals and generating at least one second control signal based on the supplemental gas bias; and at least one gas valve installed in each of the pressurizing gas pipeline and the supplemental gas pipeline and driven by one or both of the first and second control signals to regulate the solid fuel in the solid-gas mixture by changing a real time pressurizing gas flow in the pressurizing gas pipeline and a real time supplemental gas flow in the supplemental gas pipeline.

In accordance with another embodiment, a control method for controlling a dry feed system to convey a solid fact in a solid-gas mixture comprises: generating a plurality of measurement signals signifying characteristics of the dry feed system by a plurality of sensors; calculating one or both of a feed tank pressure bias and a pressuring gas flow bias based on a solid flow rate (SR) in the solid-gas mixture that is determined by at least one of the measurement signals by a pressurizing gas controller; generating at least one first control signal based on one or both of the pressure bias and the pressurizing gas flow bias by the pressurizing gas controller; calculating an assistant gas flow bias based on a solid loading ratio (SLR) in the solid-gas mixture that is determined by at least one of the measurement signals by at least one assistant gas controller; generating at least one second control signal based on the assistant gas bias by the at least one assistant gas controller; and regulating the solid fuel in the solid-gas mixture by a plurality of gas valves driven by one or both of the first and second control signals by changing a real time pressurizing gas flow and a real time assistant gas flow.

These and other advantages and features will be further understood from the following detailed description of embodiments of the invention that are provided in connection with the accompanying drawings.

DETAILED DESCRIPTION

Embodiments of the present disclosure will be described hereinbelow with reference to the accompanying drawings. In the following description, well-known functions or constructions are not described in detail to avoid obscuring the disclosure in unnecessary detail.

Figure 1:
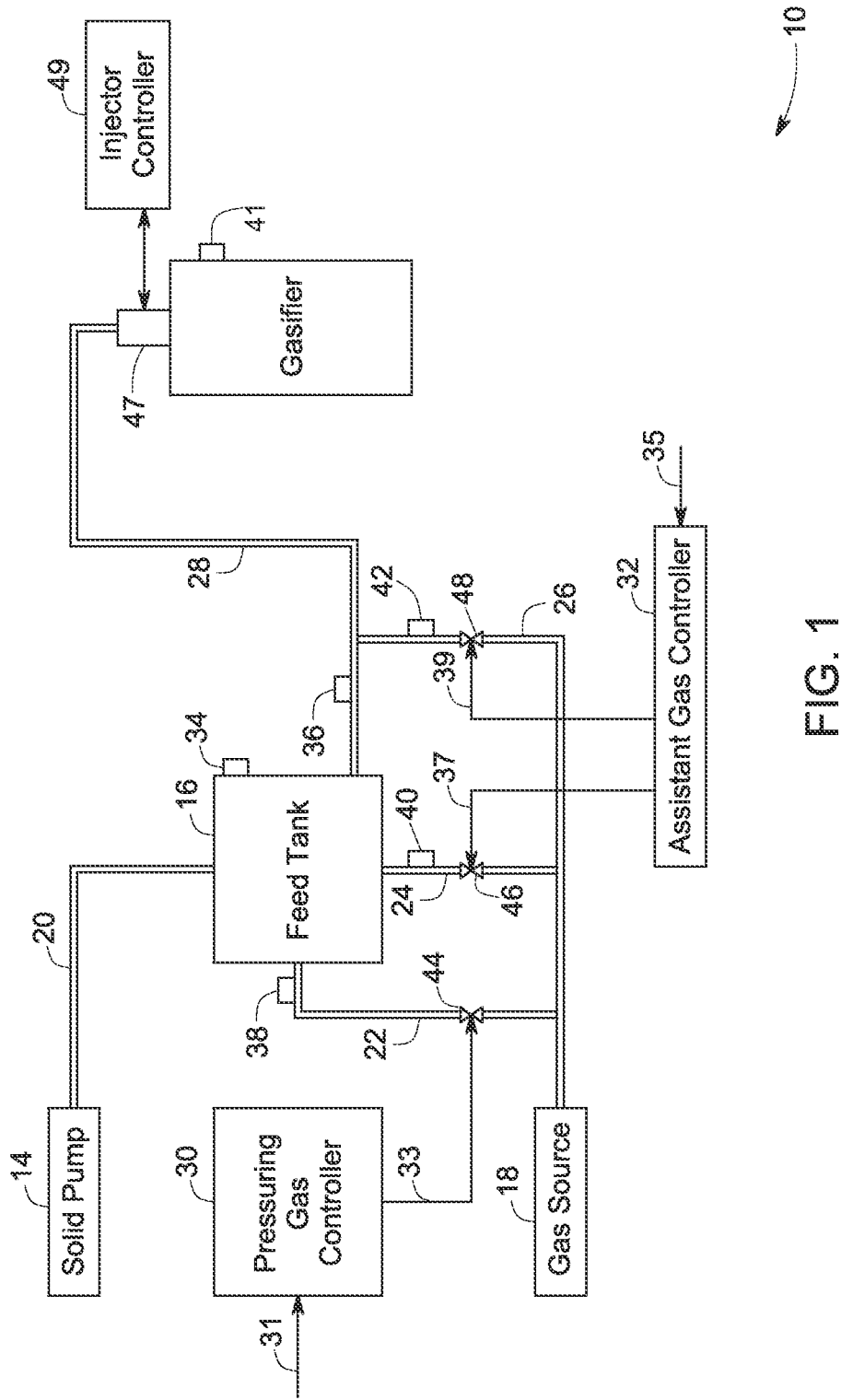
FIG. 1 is a schematic block diagram of a pneumatic conveying system including a dry feed system and a control system for controlling the dry feed system to convey a solid fuel in accordance with one embodiment.

FIG. 1 illustrates a pneumatic conveying system 10 in accordance with one embodiment. The pneumatic conveying system 10 includes a dry feed system (not labeled) for feeding a solid fuel (solid particles) to a container such as a gasifier 12 and a control system (not labeled) for controlling the dry feed system to convey the solid fuel. The dry feed system includes a solid pump 14, a feed tank 16, a gas source 18 and associated pipelines. In one example, the solid fuel is coal powder. However, it should be understood that the invention does not exclude other types of the solid fuel such as biomass applied in the dry feed system and one solid fuel with a certain amount of moisture.

In one embodiment of FIG. 1, the pipelines have a solid pipeline 20, three gas pipelines (a pressuring gas pipeline 22, a fluidizing gas pipeline 24 and a supplemental gas pipeline 26) and a mixture pipeline 28. The solid pipeline 20 connects the solid pump 14 with the feed tank 16 for conveying the solid fuel into the feed tank 16. In another embodiment, each pipeline such as 20, 22, 24, 26, and 28 have more than one. The pressuring gas pipeline 22 connects the gas source 18 with the feed tank 16 for conveying a pressurizing gas into the feed tank 16. The pressuring gas creates a high-pressure state within the feed tank 16 and is mixed with the solid fuel to form a solid-gas mixture. The pressurizing gas is also called as carrier gas. The pressure difference between the feed tank 16 and the gasifier 12 drives the solid fuel to flow towards the gasifier 12 in the feed system.

The fluidizing gas pipeline 24 connects the gas source 18 with a bottom surface of the feed tank 16 such that one assistant gas stream (referred to as "a fluidizing gas") is introduced into the feed tank 16 for further fluidizing the solid-gas mixture.

The supplemental gas pipeline 26 connects the gas source 18 with the forepart of the mixture pipeline 28 for introducing another assistant gas stream (referred to as "a supplemental gas") for adjusting the solid flow rate (SR) or/and the solid loading ratio (SLR) by changing the gas volume in the mixture pipeline 28. The fluidizing gas and the supplemental gas are injected at downstream locations of the pressurizing gas and change the gas volumes in the solid-gas mixture by altering the gas flows in the gas pipelines 24 and 26. The desirable change of the gas volumes can ameliorate the conveyance performance of the solid fuel in the solid-gas mixture.

The invention is not limited to a system in which the pressurizing gas, the fluidizing gas and the supplemental gas each come from the same gas source 18, as shown in FIG. 1. The mixture pipeline 28 connects the feed tank 16 with the gasifier 12 for conveying the solid-gas mixture.

Referring to FIG. 1, the control system includes a plurality of sensors, a pressurizing gas controller 30, an assistant gas controller 32 and a plurality of gas valves. The term "gas valve" indicates a control valve for controlling a gas flow passing through a pipeline where the control valve is installed. The solid flow rate (SR) and solid loading ratio (SLR) can reflect the conveyance performance of a solid fuel. Accordingly, these aspects can be used as proxies for performance and if the SR and SLR reflect less than desired performance, adjustments to the control process can be made until the system is operating in the expected range for these values.

The sensors are incorporated into various components of the feed system and generate a plurality of measurement signals signifying various characteristics. The control system acquires various real time values of the various characteristics such as SR, SLR, gas flow and feed tank pressure based on these measurement signals. In one example, the real time values are directly provided by the measurement signals. In another example, the real time values are calculated based on the information indicated by the measurement signals.

The pressurizing gas controller 30 calculates one or both of a feed tank pressure bias and a pressuring gas flow bias based on a SR in the solid-gas mixture that is determined by at least one measurement signal 31 and generates at least one first control signal 33. The assistant gas controller 32 calculates assistant gas biases based on a solid loading ratio (SLR) in the solid-gas mixture that is determined by at least one of measurement signal 35 and generates second and third control signals 37 and 39 based on the assistant gas biases for respectively controlling the fluidizing gas flow and the supplemental gas flow. In one example, the assistant gas controller 32 is configured to generate one of second and third control signals 37 and 39.

The gas valves are driven by the first, second and third control signals 33, 37 and 39 to regulate the solid fuel flow by changing gas flows of the pressurizing gas and one or both of the fluidizing gas and supplemental gas.

In the control system according to one embodiment, both of the SR and SLR are used tier monitoring and adjusting the solid fuel flow during conveyance, thereby increasing the control accuracy. Furthermore, the control system typically only uses gas valves to keep the solid fuel stably conveyed. Gas does not cause wear abrasion to the gas valves, thus normal material can be used for manufacturing the gas valves, thereby decreasing the valves production cost.

In the example shown in FIG. 1, the sensors include two gauge pressure sensors 34 and 41 respectively installed in the feed tank 16 and the gasifier 12, a SR sensor 36 installed in the mixture pipeline 28 and three gas flow sensors (a pressurizing gas flow sensor 38, a fluidizing gas flow sensor 40 and a supplemental gas flow sensor 42) respectively installed in the corresponding gas pipeline sections 22, 24 and 26.

In one embodiment, a weight cell sensor and a temperature sensor are further mounted on the feed tank 16 and generate signals that along with signals generated from the gauge pressure sensor 34, are used for calculating a real time SR. The calculated real time SR and the measured real time SR directly acquired from the SR sensor 36 are averaged or established a function according to predetermined algorithms to achieve a more accurate result of the real time SR. In another embodiment, a plurality of pairs of a gauge pressure sensor and a differential pressure sensor are installed in different locations of the mixture pipeline 28 for calculating the real time SR. In still another embodiment, at least two of each type of the sensors shown in FIG. 1 is provided for achieving a more accurate real time result by averaging or establishing a function among a magnitude of measured values.

The term "sensor" includes but is not limited to sensing elements, meters, or any measurement devices that can measure temperature, gauge pressure, weight or other characteristics of an object and generate measurement signals for outputting the characteristics. It can be understood that the sensors typically generate analog signals that are converted into digital signals before being used for calculation or other processing, though it is not specially mentioned in the foregoing and following embodiments.

The measured data collecting and output from the sensors and gas valves are implemented through I/O modules, including analog Input/Output modules, digital Input/Output modules. In one embodiment, a human monitoring interface (HMI) is supplied to improve the operability of the control system.

In the example shown in FIG. 1, the gas valves include a pressuring gas valve 44, a fluidizing gas valve 46 and a supplemental gas valve 48. In another embodiment, each of the gas pipelines 22, 24 and 26 is equipped with two or more corresponding gas valves such as 44, 46 and 48. In still another embodiment, the gas valves include a vent valve (not shown) that is installed on the feed tank 16 to release the feed tank pressure when a real time feed tank pressure is greater than a desired feed tank pressure. It should be noted that the gas valves include but are not limited to control valves for turning gas flows up or down and on-off type valves for promptly turning gas on or off.

In one embodiment, the pneumatic conveying system 10 further includes an injector 47 and an injector controller 49 coupled to the injector 47 for controlling a gas flow into the gasifier 12. The injector 47 is used for injecting the solid-gas mixture and an oxygen gas into the gasifier 12. The injector controller 49 calculates a desired oxygen gas flow based on the real time SR and an O/C ratio in the gasifier 12 and then generates a control signal based on the oxygen gas flow bias between the desired oxygen gas flow and a real time oxygen gas flow. At least one gas flow sensor (not shown) is installed in a pipeline (not shown) for conveying the oxygen gas and measures the real time oxygen gas flow.

Figure 2:
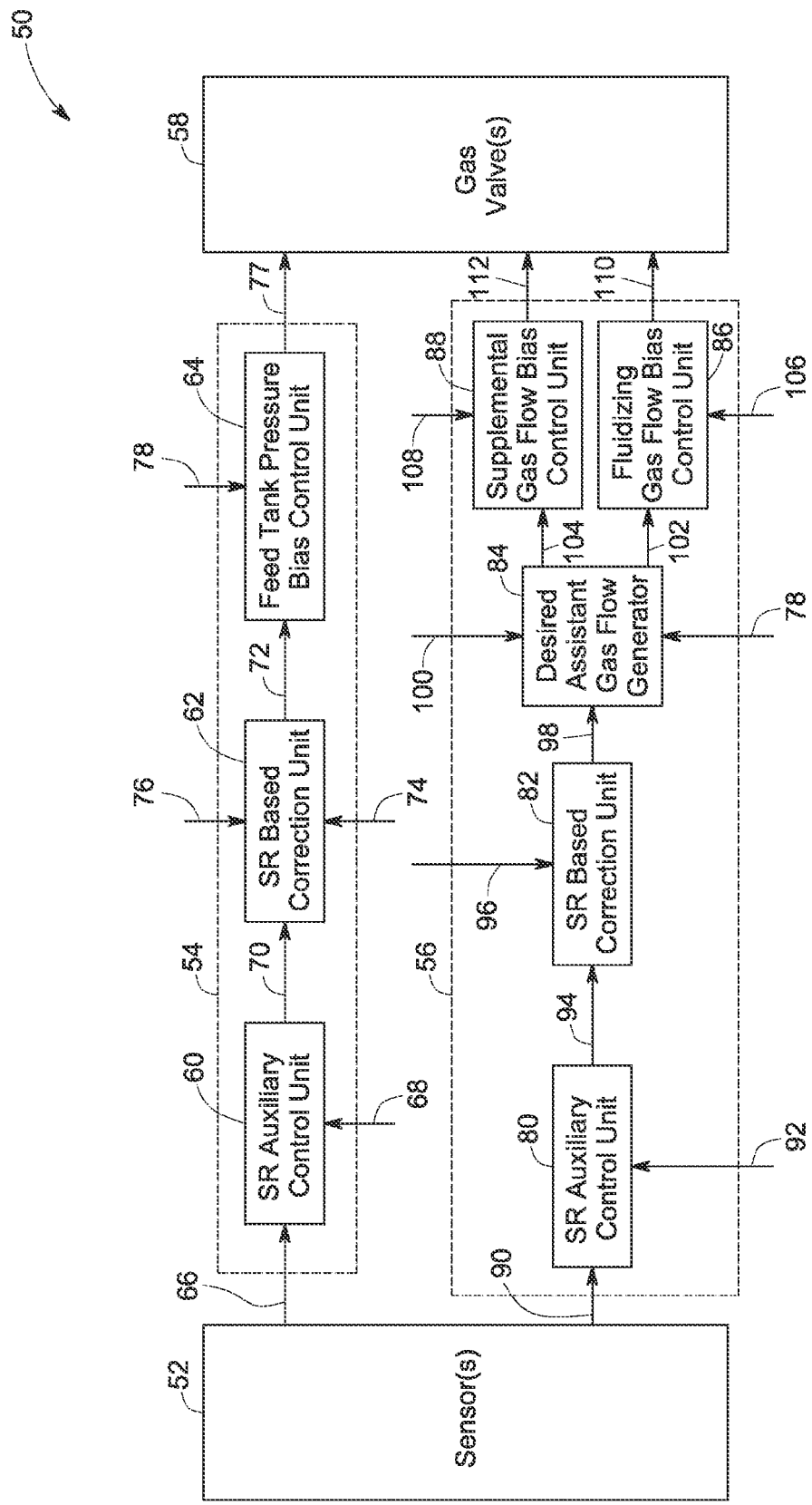
FIG. 2 is a schematic block diagram of a control system in accordance with another embodiment.

FIG. 2 illustrates a control system 50 in accordance with another embodiment. The control system 50 according to one example is used for controlling the dry feed system shown in FIG. 1 to convey the solid fuel. Referring to FIGS. 1 and 2, the control system 50 includes one or more sensors 52, a pressuring gas controller 54, an assistant gas controller 56 and a plurality of gas valves 58.

According to one embodiment, the pressuring gas controller 54 is divided into a plurality of units such as a SR auxiliary control unit 60, a SR based correction unit 62 and a feed tank pressure bias control unit 64 each of which is operatively linked with at least one of the sensors 52 for obtaining the characteristic information of the dry feed system.

The controllers in the foregoing and following embodiments such as 54 and 56 include one or more computing devices such as processors or microprocessors that can include or be coupled to a computer readable storage medium containing software for executing computer software. The computer readable storage medium in one example is physical memory storage such as a drive, disk, RAM, ROM, or other physical storage device.

Referring to FIG. 2 in conjunction with FIG. 1, the SR auxiliary control unit 60 receives a real time SR 66 and a desired SR 68 and produces an auxiliary pressure difference 70 between the gasifier 12 and the feed tank 16 based on the SR bias between the real time SR 66 and the desired SR 68.

It should be noted that the real time value is an actual value that is determined or measured in real time. In the following embodiments, the real time value is simplified to be an actual value, such as the real time SR 66 is referred to as the actual SR 66. The actual SR 66 can be determined based on at least one of the measurement signals (not shown) generated by the sensors 52 such as the SR sensor 36. In another embodiment, the pressuring gas controller 54 further has a SR calculating unit (not shown) which calculates the actual SR 66 based on a variety of sensors such as gauge pressure sensors, weight cell sensors, and pressure difference sensors. It should be understood that the invention is not limited to any specific ways and any type of sensors to calculate the actual SR 66. Further, the SR is one of the significant parameters for assessing the conveyance performance of the solid fuel, and thus the desired SR 68 can be determined by the system requirement.

The SR based correction unit 62 receives the auxiliary pressure difference 70 from the SR auxiliary control unit 60, a desired pressure difference 74 and a gasifier pressure 76 and adds the three values together to produce a desired feed tank pressure 72. The desired pressure difference 74 can be determined by system requirements, and the gasifier pressure 76 can be determined by at least one of the measurement signals by the sensors 52 such as the gauge pressure sensor 41.

The feed tank pressure bias control unit 64 receives the desired and actual feed tank pressures 72 and 78 and generates at least one control signal 77 based on the feed tank pressure bias for actuating at least one of the gas valves 58 such as the pressuring gas valve 44 to regulate the actual SR 66 by changing the pressurizing gas flow.

In the pressurizing gas controller 54, the SR bias is used to compensate the desired feed tank pressure, which can decrease system errors, thereby improving control accuracy.

In the example shown in FIG. 2, the assistant gas controller 56 includes a SLR auxiliary control unit 80, a SLR based correction unit 82, a desired assistant gas flow generator 84, a fluidizing gas flow bias control unit 86 and a supplemental gas flow bias control unit 88.

The SLR auxiliary control unit 80 receives an actual SLR 90 and a desired SLR 92 and generates an auxiliary superficial velocity 94 of the solid-gas mixture in the mixture pipeline 28. The actual SLR 90 is obtained based on the measurement signals generated by the sensors 52. Further, the SLR is another significant parameter for assessing the conveyance performance of the solid fuel, and the desired SLR 92 also can be determined, by the system requirements.

A desired superficial velocity 96 is determined by the system requirements and inputted into SLR based correction unit 82 for compensating. The auxiliary superficial velocity 94 obtained from the SLR auxiliary control unit 80 is then added to the desired, superficial velocity 96 to produce a total superficial velocity 98. The desired assistant gas flow generator 84 is configured to produce a desired fluidizing gas flow 102 and a desired supplemental gas flow 104 based on the total superficial velocity 98. According to one embodiment, the desired assistant gas flow generator 84 produces one of the desired fluidizing gas flow 102 and the desired supplemental gas flow 104.

According to one embodiment, the actual feed tank pressure 78 and an actual pressurizing gas flow 100 are inputted into the desired assistant gas flow generator 84. The desired fluidizing gas flow 102 is calculated based on the actual feed tank pressure 78. As for the desired supplemental gas flow 104, a whole required gas flow (not shown) is calculated from the total superficial velocity 98 firstly, and then the actual pressurizing gas flow 100 and the actual fluidizing gas flow 102 are subtracted from it to acquire the desired supplemental gas flow 104.

Then, the fluidizing gas flow bias control unit 86 receives an actual fluidizing gas flow 106 from the sensors 52 and the desired fluidizing gas flow 102 and generates at least one control signal 110 based on the fluidizing gas flow bias between the actual fluidizing gas flow 106 and the desired fluidizing gas flow 102 to activate at least one of the gas valves 58 such as the fluidizing gas valve 46.

The supplemental gas flow bias control unit 88 receives an actual supplemental gas flow 108 from the sensors 52 and the desired supplemental gas flow 104 and generates at least one control signal 112 based on the supplemental gas flow bias between the supplemental gas flow 108 and the desired supplemental gas flow 104 to activate at least one of the gas valves 58 such as the supplemental gas valve 48. In one embodiment, one of the fluidizing and supplemental gas flow bias control units 86 and 88 is provided.

Figure 3:
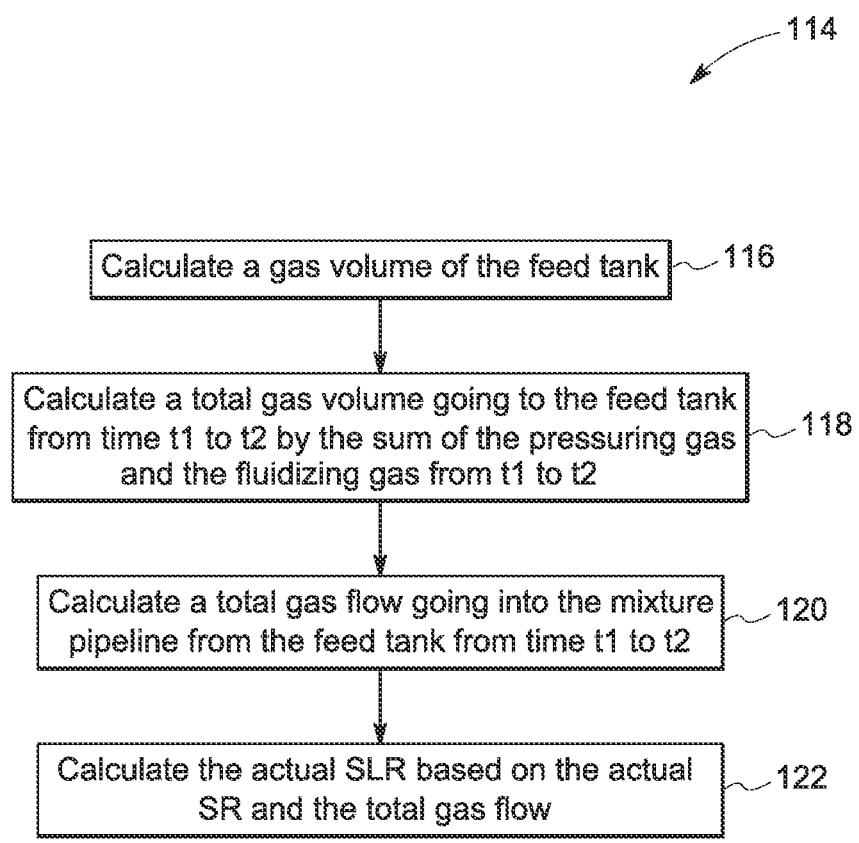
FIG. 3 is a flow chart illustrating a method for calculating a real time solid loading ratio (SLR) in a control system in accordance with still another embodiment.

In one embodiment, the assistant gas controller 56 further includes a SLR calculating unit (not shown) for providing the actual SLR 90. FIG. 3 illustrates a calculating process 114 that is implemented in the SLR calculating unit. Referring to FIGS. 1 and 3, in step 116, a gas volume of the feed tank 16, $V_{gas,sending}$, is calculated according to equations (1) and (2):

$$V_s + V_h = V_{vessel} \quad (1)$$

$$\rho_s V_s + \rho_g V_g = W_c \quad (2)$$

wherein, $V_{vessel}$ is the feed tank volume which is a predetermined value; $\rho_s$ stands for solid fuel density which approximately equal to apparent density. For example, the density of one kind of coal sample is 1390 Kg/m³. $W_c$ is the weight of the solid-gas mixture in the feed tank which can be acquired from a weigh cell sensor. $\rho_g$ is the gas density at operation condition, and can be acquired based on equation (3)

$$\rho_g = \frac{(P_s + 0.101325) \cdot \rho_0 T_0}{0.101325 \cdot (T_s + T_0)} \quad (3)$$

wherein, $P_s$ and $T_s$ are the pressure and temperature of the feed tank pressure which can be acquired from a gauge pressure sensor and a temperature sensor. $\rho_0$ and $T_0$ are the standard gas density (the standard density of $N_2$ is 1.2504 Kg/m³) and standard temperature (273.15° C.).

The gas volume of the feed tank 16, $V_{gas,sending}$, is transferred into the standard condition. The gas volume in standard condition (referred to as "standard gas volume") is noted as $V_{g-SC}$ and the standard gas volume at time t1 and t2 are respectively noted as $V_{g1-SC}$(t1) and $V_{g2-SC}$(t2).

In step 118, a total gas volume, $V_{g-SC}$(t1~t2) going to the feed tank 16 from time t1 to t2 is calculated by the sum of the pressurizing gas and the fluidizing gas from time t1 to t2, which is represented as equation (4):

$$V_{g3-SC}(t1 \sim t2) = \sum_{t1}^{t2} Q_p + \sum_{t1}^{t2} Q_f \quad (4)$$

wherein, the pressurizing gas flow and the fluidizing gas flow can be acquired based on the measurement signals generated by the pressurizing gas flow sensor 38 and the fluidizing gas flow sensor 40.

In step 120, a total gas flow, $Q_{PF}$, going into the mixture pipeline 28 from the feed tank 16 from time t1 to t2 is calculated according to the equation (5):

$$Q_{PF} = \frac{V_{g3-SC} + V_{g2-SC} - V_{g1-SC}}{t2 - t1} \quad (5)$$

In this example, the supplemental gas is injected into the mixture pipeline 28. The supplemental gas flow sensor 36 can measure the supplemental gas flow. Therefore, a total gas flow, $Q_{FM}$, including the supplemental gas in the mixture pipeline 28 is expressed as the equation (6):

$$Q_{FM} = \frac{Q_{PF} + \frac{\sum_{t1}^{t2} Q_s}{t2 - t1}}{RT} \quad (6)$$

wherein, $Q_s$ stands for the supplemental gas flow; R stands for the semidiameter of the mixture pipeline 28; T stands for the temperature of the mixture pipeline 28, which approximately equals to the feed tank temperature which can be obtained by installing a temperature sensor in the feed tank 16.

in step 122, the actual SLR 90, is calculated based on the actual SR 66 and the total gas flow, $Q_{FM}$, which is represented by the equation (7):

$$SLR = \frac{SR}{n \cdot Mg} \quad (7)$$

wherein, SR is stands for the actual SR 66 which can be directly acquired from the SR sensor 36; and Mg stands for molar mass of the pressurizing gas.

Figure 4:
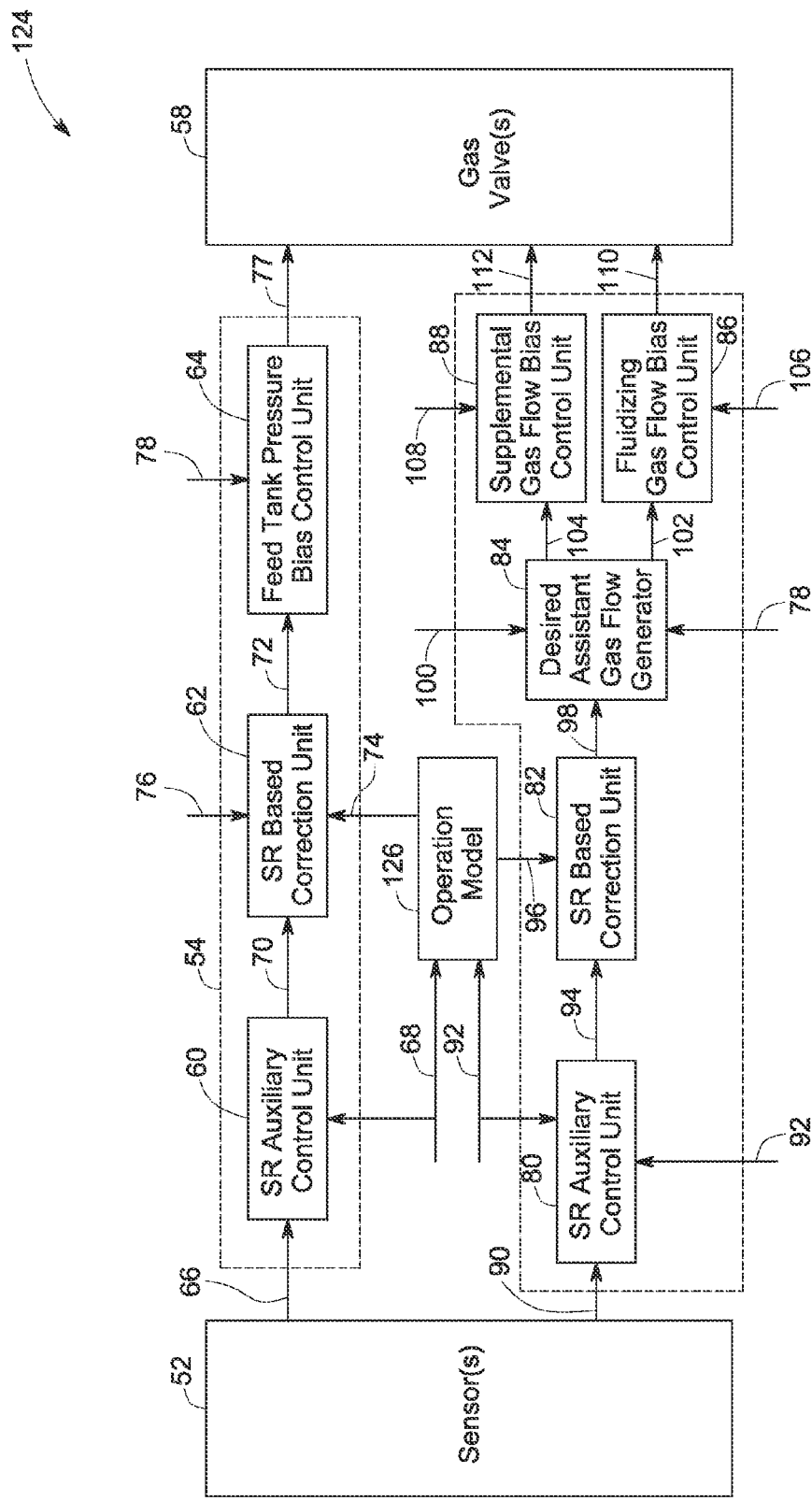
FIG. 4 is a schematic block diagram of a control system in accordance with still another embodiment.

FIG. 4 illustrates a control system 124 in accordance with still another embodiment. The control system 124 is similar to the control system 50 as shown in FIG. 2. The difference is that the control system 124 further includes an operation model 126.

Referring to FIGS. 1 and 4, in one embodiment, the operation model 126 is configured to represent relationships among the following elements: SR, SLR, pressure difference between the gasifier 12 and the feed tank 16 and superficial velocity of the solid-gas mixture. Using the operation model 126, any two of the four elements can be achieved if the other two are given. In one embodiment, the operation model includes a plurality of equations. In another embodiment, the operation model is a four-dimensional chart that is drawn based on a multitude of experiment data.

in the control system 124, the desired SR 68 and the desired SLR 92 are determined by the system requirements and then inputted into the operation model 126 for achieving the desired pressure difference 74 and the desired superficial velocity 96. The operation model 126 is concluded from a magnitude of experimental data, which improves the accuracy of the desired pressure difference 74 and the desired superficial velocity 96, thereby leading to increased control accuracy of the control system 124.

Figure 5:
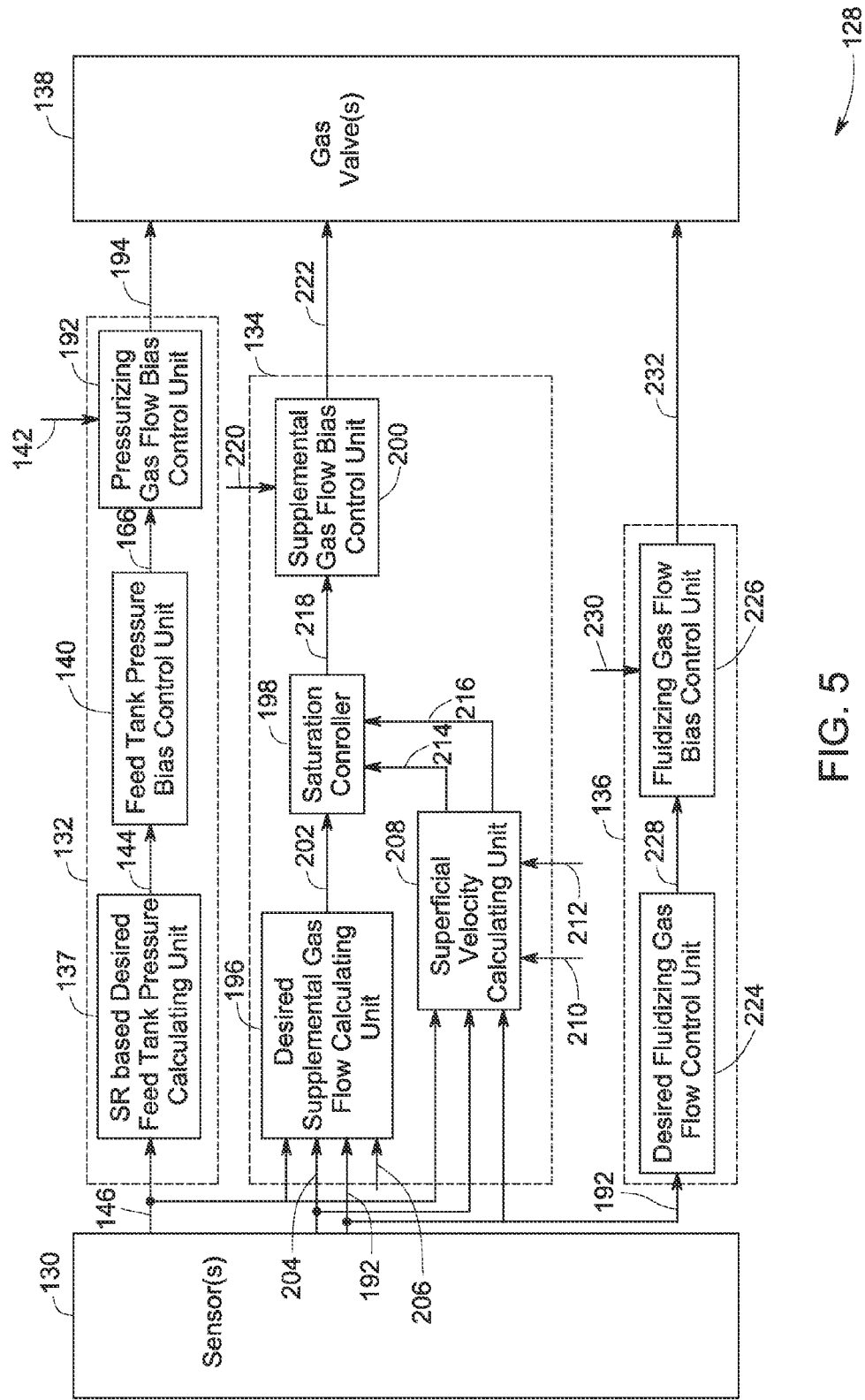
FIG. 5 is a schematic block diagram of a control system in accordance with still another embodiment.

FIG. 5 illustrates a control system 128 in accordance with still another embodiment. In one embodiment, the control system 128 is used for regulating the solid fuel flow of the feed dry system of FIG. 1. The control system 128 includes a plurality of sensors 130, a pressuring gas flow controller D2, a supplemental gas flow controller 134, a fluidizing gas flow controller 136 and a plurality of gas valves 138.

The sensors 130 are coupled to the three gas flow controllers 132, 134 and 136 and provides various information of the dry feed system by generated measurement signals to the three gas flow controllers 132, 134 and 136. The three gas flow controllers 132, 134 and 136 generates control signals to drive the gas valves 138 to regulate the solid, fuel flow by changing the corresponding gas flows.

Referring to FIGS. 1 and 5, the pressuring gas flow controller 132 includes a SR based desired feed tank pressure calculating unit 137, a feed tank pressure control unit 140 and a pressurizing gas flow bias control unit 142. The SR based desired feed tank pressure calculating unit 137 is configured to calculate a desired feed tank pressure 144 based on at least one measurement signal 146. In one embodiment, the SR based desired feed tank pressure calculating unit 137 is configured as the structure shown in FIG. 6 and includes a SR comparator 148 and an optional computation unit 150.

There are three input data: a desired SR 152, $SR^d$, an actual SR 154, $SR^a$, and a desired SR control accuracy 156, $ACC_{SR}$ for the SR comparator 148. The desired SR 152 and the desired SR control accuracy 156 can be predetermined according to system requirements. The actual SR 154 can be directly acquired from a SR sensor such as 36 in FIG. 1. In another embodiment, the actual SR. 154 is acquired based on a plurality of sensors.

The SR comparator 118 is configured to compare the actual SR 154 with the results by multiplying the desired SR 152 by $(1-ACC_{SR})$ or $(1+ACC_{SR})$ and generate different choosing signal 158. The optional computation unit 150 is activated by the choosing signal 158 to adopt suitable computing algorithms to calculate the desired feed tank pressure 144.

Figure 6:
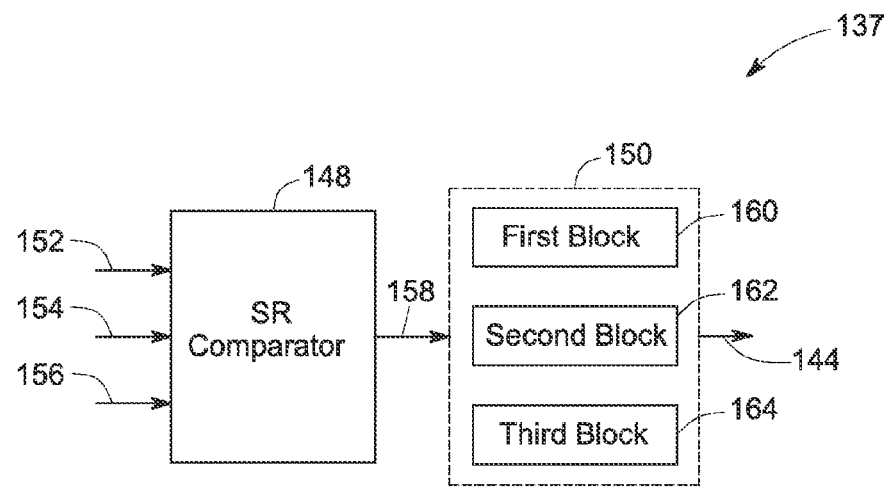
FIG. 6 is a schematic block diagram of a SR based desired feed tank pressure calculating unit in a control system in accordance with still another embodiment.

In one embodiment, the optional computation unit 150 as shown in FIG. 6 includes a first, second and third blocks 160, 162 and 164 having different computing algorithms. In the first block 160, the computing algorithm is that the desired feed tank pressure 144, $P_s^d$, is obtained by the sum of the actual feed tank pressure, $P_s^a$, a desired feeding pressure calculating accessory, $\overline{P}$. The actual feed tank pressure, $P_s^a$, can be directly acquired from a gauge pressure sensor such as 34 in FIG. 1. The desired feeding pressure calculating accessory, $\overline{P}$, is determined by system requirements.

In the second block 162, the computing algorithm is represented by:

$$P_s^d = P_s^a + K_{SR}(SR^d - SR^a)$$

wherein $K_{SR}$, stands for proportional SR control and can be determined by system requirement. In the third block 164, the computing algorithm is that the desired feed tank pressure 144, $P_s^d$ is calculated by subtracting the desired feeding pressure calculating accessory, $\overline{P}$, from the actual feed tank pressure, $P_s^a$.

In operation according to one embodiment, the first block 160 is activated when the actual SR 154 is smaller than the desired SR 152 multiplied by $(1-ACC_{SR})$(referred to as "$SR^d \times (1-ACC_{SR})$"). The third block 164 is activated when the actual SR 154 is greater than the desired SR 152 multiplied by $(1+ACC_{SR})$ (referred to as "$SR^d \times (1+ACC_{SR})$"). When the actual SR 154 falls within the range between $SR^d \times (1-ACC_{SR})$ and $SR^d \times (1+ACC_{SR})$, the second block 162 is used.

Referring again to FIGS. 1 and 5, the feed tank pressure control unit 140 is configured to calculate a desired pressurizing gas flow 166 based on the desired feed tank pressure 144, a real time information indicated by at least one of the measurement signals not shown) generated by the sensor 130 and other predetermined system parameters (not shown).

Figure 7:
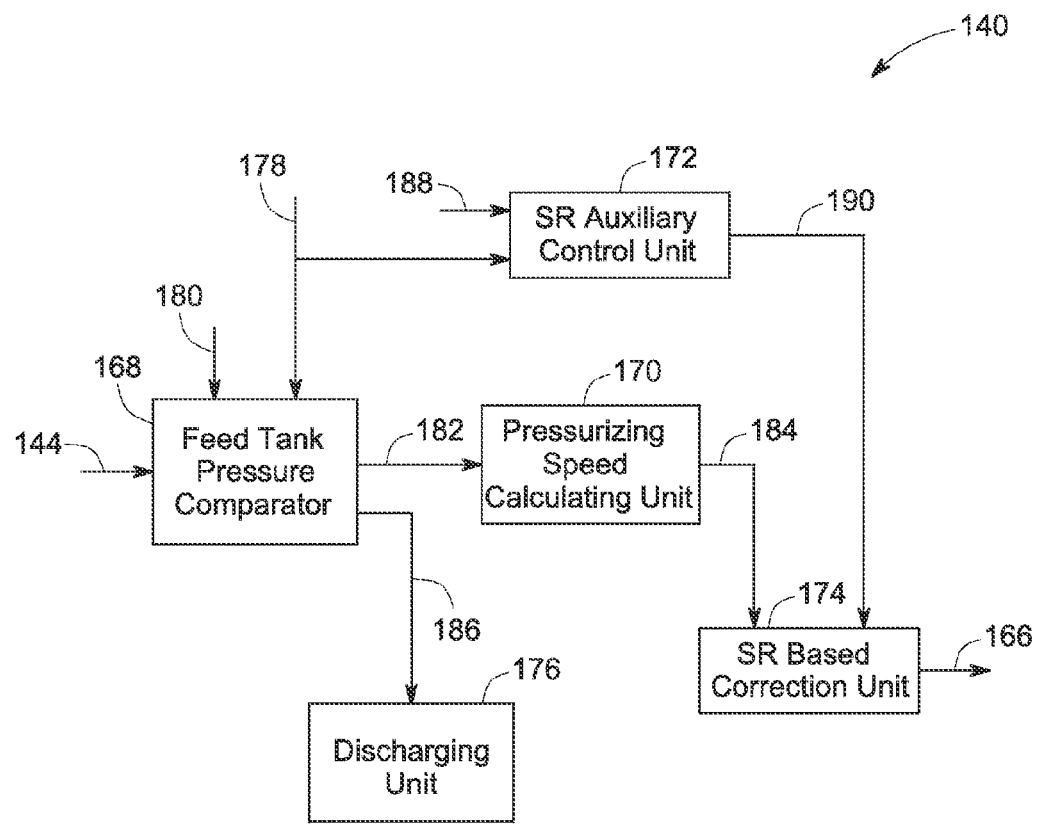
FIG. 7 is a schematic block diagram of a feed tank pressure control unit of a control system in accordance with still another embodiment.

FIG. 7 illustrates an example of the feed tank pressure control unit 140. According to this example, the feed tank pressure control unit 140 include a feed tank pressure comparator 168, a pressurizing speed calculating unit170, a SR auxiliary control unit 172, a SR based correction unit 174 and a discharging unit 176.

In the feed tank pressure comparator 168 in one example, there are three input data: the desired feed tank pressure 144, $P_s^d$, the actual feed tank pressure 178, $P_s^a$, and a desired feed tank control accuracy 180, $ACC_p$. The feed tank pressure comparator 168 is configured to compare the $P_s^a$ with $(P_s^d - ACC_p)$ and $(P_s^d + ACC_p)$ and generate a choosing signal 182 for controlling the pressurizing speed calculating unit 170 to output a pressurizing speed 184 of the feed tank pressure.

In the pressurizing speed calculating unit 170, the pressurizing speed 184 is determined, by system requirements when the actual feed tank pressure 178, $P_s^a$, is smaller than the $(P_s^d - ACC_p)$. The pressurizing speed 184 is determined based on a feed tank pressure bias when the actual feed tank pressure 178, $P_s^a$, falls into the range between the $(P_s^d - ACC_p)$ and $(P_s^d + ACC_p)$. Once the actual feed tank pressure 178, $P_s^a$, is greater than the $(P_s^s + ACC_p)$, the discharging unit 176 is activated by a control signal 186 from the feed tank pressure comparator 168 to drive at least one vent valve (not shown) for releasing the feed tank pressure, 100671 In one embodiment, the feed tank pressure control unit 140 include a feed tank pressure comparator 168, a pressurizing speed calculating unit170, a SR auxiliary control unit 172, a SR based correction unit 174 and a discharging unit 176. In this example, the feed tank pressure comparator 168 is configured to generate at least one control signal when the actual feed tank pressure 178, $P_s^a$, is greater than the $(P_s^d + ACC_p)$. The at least one control signal drives at least one on-off type valves (not shown) installed on the pressuring gas pipeline 22 to promptly turn off the pressuring gas into the feed tank 16 with reference to FIG. 1.

The SR based correction unit 174 is configured to provide a compensated value190 based on an actual SR 118 and the actual feed tank pressure 178. In the SR based correction unit 174, firstly an original desired pressurizing gas flow is obtained based on the pressurizing speed 184, and then compensated value190 is used to compensate the original desired pressurizing gas flow to obtain the desired pressurizing gas flow 166.

Referring again to FIGS. 1 and 5, in the control system 128, the desired pressurizing gas flow 166 functioning as one input comes into the pressurizing gas flow bias control unit 142 and compares with another input an actual pressurizing gas flow 192 which is can be acquired from one of the sensors 130 such as the pressurizing gas flow sensor 38 (see FIG. 1) to produce a pressurizing gas flow bias. Then the pressurizing gas flow bias control unit 142 generates at least one control signal 194 based on the pressurizing gas flow bias. At least one of the gas valves 138 such as the pressurizing gas valve 44 is activated by the control signal 194 to regulate the actual SR by changing the pressurizing gas flow.

The supplemental gas flow controller 134 in one example includes a desired supplemental gas flow calculating unit 196, a saturation controller 198 and a supplemental gas flow bias control unit 200. The desired supplemental gas flow calculating unit 196 is configured to provide a desired supplemental gas flow 202 based on an actual fluidizing gas flow 204, an actual pressurizing gas flow 192 and the actual SR 146 as well as a desired SLR 206. The desired supplemental gas flow calculating unit 196 is coupled to the sensors 130 and acquires the actual fluidizing gas flow 204, the actual supplemental gas flow 220 and the actual SR 146 from the measurement signals generated by the sensors 130. In one embodiment, the supplemental gas flow controller 134 further include a calculation unit for calculating each of the actual fluidizing gas flow 204, the actual pressurizing gas flow 192 and the actual SR 146 based on the measurement signals generates by the sensor 130 according to suitable computing algorithms. Further, the desired SLR 206 can be determined by system requirement.

The desired supplemental gas flow 202 then comes into the saturation controller 198 for output constraints. In the example of FIG. 5, the supplemental gas flow controller 134 further includes a superficial velocity calculating unit 208 for providing threshold values of the desired supplemental gas flow for the saturation controller 198. The superficial velocity calculating unit 208 receives the actual fluidizing gas flow 204, the actual pressurizing gas flow 192 and the actual SR 146 as well as maximum and minimum values 210 and 212 of a desired superficial velocity, $Ug^{max}$ and $Ug^{min}$, and outputs maximum and minimum values 214 and 216, $Q_s^{max}$ and $Q_s^{min}$, of the desired supplemental gas flow into the saturation controller 198. The $Ug^{max}$ and $Ug^{min}$ can be determined by system requirement. The saturation controller 198 constraints the desired supplemental gas flow 202 and output the final desired supplemental gas flow 218 which could equal to the desired supplemental gas flow 202, the minimum desired supplemental gas flow 216 or the maximum desired supplemental gas flow 214.

The supplemental gas flow bias control unit 200 receives the desired supplemental gas flow 218 and an actual supplemental gas flow 220 and generate at least one control signal 222 based on the supplemental gas flow bias between the desired and actual supplemental gas flow 218 and 220. The at least one control signal 222 drives at least one of the gas valves 138 such as the supplemental gas valve 48 to adjust the supplemental gas flow to keep the solid fuel flow stably at downstream conveyance.

The fluidizing gas flow controller 136 in one example includes a desired fluidizing gas flow control unit 224 and a fluidizing gas flow bias control unit 226. The fluidizing gas flow controller 136 is used for controlling solid fuel flow by changing a fluidizing gas flow that is introduced, into the feed tank with reference to FIG. 1. The desired fluidizing gas flow control unit 224 receives the actual feed tank pressure 192 and is configured to produce a desired fluidizing gas flow 228 based on the actual feed tank pressure 192 according to predetermined calculation formula.

The fluidizing gas flow bias control unit 226 receives the desired fluidizing gas flow 228 and an actual fluidizing gas flow 230 and generate at least one control signal 232 based on the fluidizing gas flow bias between the desired and actual fluidizing gas flow 228 and 230. The at least one control signal 232 drives at least one of the gas valves 138 such as the fluidizing gas valve 46 for adjusting the fluidizing gas flow to keep the solid fuel flow stably. In one embodiment, only the two controllers 132 and 134 are used to keep the control accuracy.

In the control system 128, the solid fuel flow is regulated by the combination control of the pressurizing gas flow, the fluidizing gas flow and the supplemental gas flow based on the actual SR, actual SLR and actual feed tank pressure and other related parameters, which leads to increased control accuracy. Only adopting gas valves to control during control processing leads to a decreased production cost.

Furthermore, a safety instrumentation and emergency shutdown system, which is a self-governed system relative to the basic process control system, is be supplied to monitor the real time system status and alarm even shut down the dry feed system when abnormal statuses happen.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A control system for controlling a dry feed system to convey a solid fuel in a solid-gas mixture, comprising:
a plurality of sensors incorporated into components of a dry feed system and generating a plurality of measurement signals signifying characteristics of the dry feed system;
a pressuring gas controller comprising a processor and a non-transitory computer readable storage medium storing instructions that cause the pressuring gas controller to:
calculate a solid flow rate (SR) of the solid-gas mixture based on at least one of the plurality of measurement signals;
calculate at least one of a feed tank pressure bias and a pressuring gas flow bias based on the solid flow rate (SR); and
generate at least one first control signal based on the at least one of:
the pressure bias and the pressurizing gas flow bias;
at least one assistant gas controller comprising a processor and a non-transitory computer readable storage medium storing instructions that cause the at least one assistant gas controller to:
calculate a solid loading ratio (SLR) of the solid gas mixture;
calculate an assistant gas bias based on the solid loading ratio (SLR); and
generate at least one second control signal based on the assistant gas bias; and
a supplemental gas controller comprising a processor and a non-transitory computer readable storage medium storm instructions that cause the supplemental as controller to:
calculate a supplemental gas flow bias; and
generate at least one third control signal based on the supplemental gas flow;
a plurality of gas valves incorporated into gas pipelines of the dry feed system and driven by the at least one first control signal, said at least one second control signal and said at least one third control signal,
wherein said at least one first control signal and said at least one second control signal controls a pressuring gas valve regulating an amount of the solid fuel and an amount of gas, respectively, in the solid-gas mixture provided to a mixture pipeline; and
wherein said at least one third control signal controls a supplemental gas valve that changes a real-time supplemental gas flow introduced into said mixture pipeline to alter said solid gas mixture in said mixture pipeline.

2. The control system of claim 1, wherein said supplemental gas flow bias is determined as a difference between a desired supplemental gas flow and a real time supplemental gas flow.

3. The control system of claim 2, wherein the desired supplemental gas flow is compensated based on a SLR bias between a desired SLR and a real time SLR.

4. The control system of claim 2, wherein the desired supplemental gas flow is calculated based on a desired SLR, a real time pressurizing gas flow, the real time supplemental gas flow and a real time SR.

5. The control system of claim 4, wherein the supplemental gas flow controller comprises:
a saturation controller comprising a processor and a non-transitory computer readable storage medium storing instructions that cause the saturation controller to constrain the desired supplemental gas flow.

6. The control system of claim 5, wherein the supplemental gas flow controller comprises:

a superficial velocity calculating unit for providing maximum and minimum values of the desired supplemental gas flow based on the real time pressurizing gas flow, the real time supplemental gas flow and the real time SR as well as maximum and minimum values of a desired superficial velocity of the solid-gas mixture.

7. The control system of claim 1, wherein the at least one assistant gas controller comprises:

a fluidizing gas flow controller comprising a processor and a non-transitory computer readable storage medium storing instructions that cause the fluidizing gas flow controller to:

calculate a fluidizing gas flow bias based on a real time feed tank pressure; and generate at least one other control signal to drive at least one of the gas valves to change at least one fluidizing gas flow being introduced into a feed tank of the dry feed system.

8. The control system of claim 7, wherein the feed tank pressure bias is determined based on a desired feed tank pressure and a real time feed tank pressure; and wherein the desired feed tank pressure is compensated based on a SR bias between a desired SR and a real time SR.

9. The control system of claim 7, further comprising:

an operation model providing a desired feed tank pressure and a desired superficial velocity of the solid-gas mixture based on a desired SR and a desired SLR.

10. The control system of claim 1, wherein the pressurizing gas flow bias is acquired by a desired pressurizing gas flow and the real time pressurizing gas flow; and wherein the desired pressurizing gas flow is calculated based on a pressurizing speed of a feed tank in the dry feed system which is produced based on the teed tank pressure bias.

11. The control system of claim 10, wherein the desired pressurizing gas flow is compensated based on a real time SR and the real time feed tank pressure.

* * * * *